United States Patent [19]

Cairns et al.

[11] 4,275,756

[45] Jun. 30, 1981

[54] PLASTIC VALVE CORE

[75] Inventors: Rodney J. Cairns, Altavista; Stefan P. Whitelaw, Lynchburg, both of Va.

[73] Assignee: National Distillers and Chemical Corporation, New York, N.Y.

[21] Appl. No.: 165,306

[22] Filed: Jul. 2, 1980

Related U.S. Application Data

[63] Continuation of Ser. No. 20,102, Mar. 12, 1979, abandoned.

[51] Int. Cl.³ .............................................. F16K 15/20
[52] U.S. Cl. ................................. 137/234.5; 251/356; 251/357
[58] Field of Search ............................ 137/234.5, 223; 152/429; 251/333, 356, 357

[56] References Cited

U.S. PATENT DOCUMENTS

| | | | |
|---|---|---|---|
| 1,313,554 | 8/1919 | Nielsen | 137/233 |
| 1,991,974 | 2/1935 | Broecker | 137/234.5 X |
| 3,207,172 | 9/1965 | Steer | 137/234.5 |

FOREIGN PATENT DOCUMENTS 1942244  1/1970  Fed. Rep. of Germany ........ 137/234.5

*Primary Examiner*—Harold Weakley
*Attorney, Agent, or Firm*—Kenneth D. Tremain

[57] ABSTRACT

A valve core or insides for a valve device, said core being made primarily of plastic such that its manufacturing costs are considerably reduced, the core being specially configured to allow for substantial air flow through the core while insuring good dynamic sealing.

6 Claims, 3 Drawing Figures

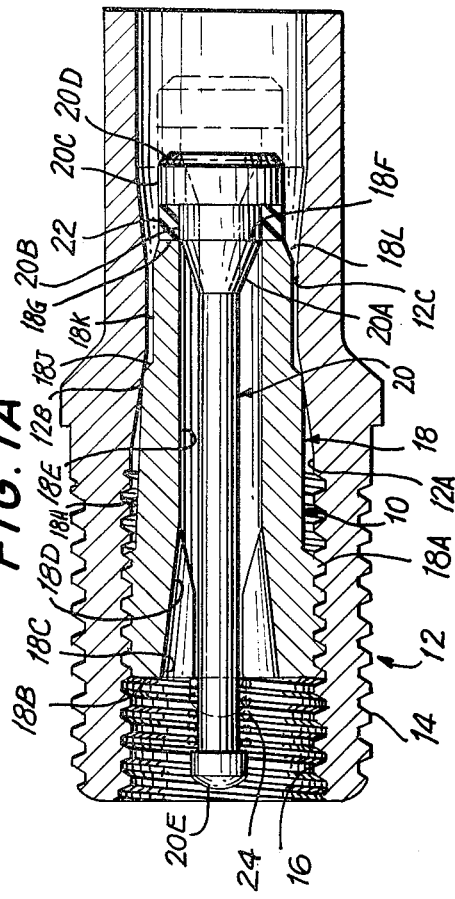
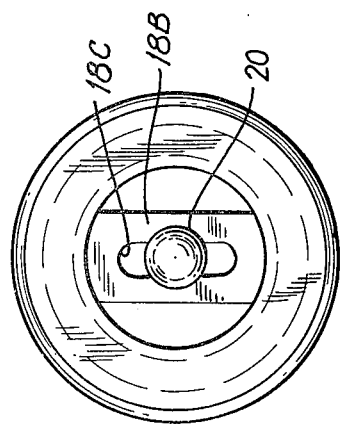
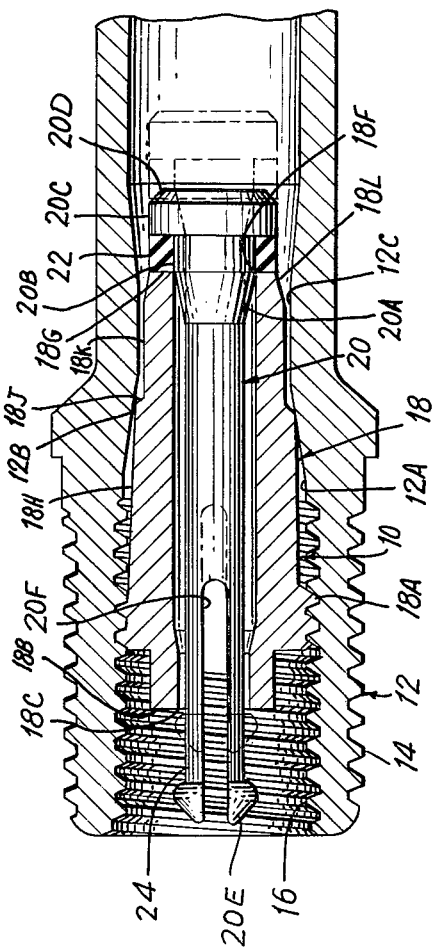

PLASTIC VALVE CORE

This is a continuation, of application Ser. No. 020,102 filed Mar. 12, 1979, now abandoned.

BACKGROUND, OBJECTS AND SUMMARY OF THE INVENTION

This invention pertains to improvements in tire valves, and more particularly, to a novel construction for the insides or valve core therefor.

It has been recognized as highly desirable in the manufacture of tire valves and the like that the insides of the valve, or what is commonly termed the valve core, be inexpensively reproducible. Also, it is very advantageous if the core is adapted to fit a standard drilled valve body.

The fabrication of conventional tire valve cores of metal has involved the requirement that the barrel or core body be of reasonably thin construction such that the cost of manufacture of such an article will not be prohibitive. This has commonly led to the formation of a valve core structure with a dynamic sealing arrangement that provides a cup-like member at the end of the core pin. For an example of such a configuration or structure, reference may be made to U.S. Pat. No. 4,091,999. In accordance with that construction, a disc shaped rubber sealing means is fitted within the cup-like member and is normally pressed against the end of the metallic barrel of the valve core with sufficient force to provide an air-tight seal. Reference may also be made to U.S. Pat. No. 1,991,974 in which a springless construction for a tire valve core is disclosed.

Because of the limitation on the thickness of the metallic barrel dictated by cost considerations, the rubber sealing means or washer associated therewith makes surface contact over a rather limited area with respect to the end of the barrel. Also, such construction has the disadvantage that should any minute particles of dirt be lodged in the cup-like member, that is, in contact with the washer or grommet, a sufficiently tight seal will not be produced. Moreover, it is often found in practice that at high speeds the inertia of the movable parts of the valve core may break the seal; thus, for example, when the tire travels over a rough road or is subject to severe jolting, air may be allowed to escape, this being more so in the case of a valve core construction which involves the aforesaid cup-like closure member.

Accordingly, it has been a long sought after objective to eliminate some of the disadvantageous aspects of metallic valve core construction. To this end certain proposals of plastic valve cores, or at least of the barrels thereof, have been disclosed in the prior art. In order to furnish background for the present invention in this connection reference may be made to U.S. Pat. No. 3,207,172 in which a molded nylon cylindrical barrel for a valve core is disclosed, such barrel having an axial bore extending through and, in particular, having an outwardly tapered bearing surface at the lower or second end of the barrel. One of the objects of the invention in such patent is to advantageously exploit the capability of the material, that is, the plastic of which the barrel is composed, to provide a static seal with respect to the standard core drilling taper seat. In other words, the unit is self-sealing because the polymeric or plastic material itself provides the static seal with respect to the valve body.

However advantageous and beneficial the different aspects of the prior art proposals and particularly of the valve core proposed or disclosed in 3,207,172, the fact remains that in most instances it is preferable to have a greater surface area than there afforded for the purpose of effectuating a safe seal. Moreover, with respect to the aforementioned sealing of a metallic barrel according to which a cup-like member is employed, the structure of that cup-like member is such that it tends to cause on occasion a hanging up of the valve sealing means. This can be understood inasmuch as the internal bore of the valve stem or body into which the valve core is fitted, is narrowly dimensioned and sufficient clearance is not always attained.

It is therefore a primary object of the present invention to provide a valve core that will result in substantial reduction in material costs and in cost of manufacture and assembly of components, while insuring that a sufficiently broad annular surface area will be provided at the end of the valve core barrel so that an efficient and safe sealing will be achieved.

A further object is to provide a valve core that will fit into a standard drilled valve body, and yet will be self-sealing into the standard tapered seat therein.

Another object of the present invention is to hold the various components of the valve core to close dimensional tolerances, that is to say, to closer tolerances than formerly provided by pressed or formed parts conventionally used. This is accomplished because of the nature of the material, that is, because a plastic is involved and injection molding techniques may be utilized.

Yet another fundamental object of the present invention is to provide flexibility in the fabrication of a valve core such that an external closing spring can be incorporated into the construction but need not be. Thus the spring is incorporated only so as to meet specific service requirements.

Briefly, the present invention comprises a molded or otherwise formed plastic, e.g., polymeric, valve core including a cylindrical barrel having an axial bore extending therethrough, and having an external threaded portion thereon near a first or outer end of said barrel for threadable engagement with the interior threads of a valve stem or body. The second or inner part of the barrel is adapted by itself to provide the requisite static seal with respect to said valve body. The second end of the barrel has a substantial annular thickness of the order of 0.035–0.040 inches. This broad annulus constitutes the seating means for the valve proper, and a suitable sealing gasket or washer is adapted to be compressed against the seat provided by the annular end. This sealing washer fits around the end of the pin of the valve core, it being understood that the valve core of the present invention comprises the three simple components only, namely, the already described valve barrel, the pin member, and the sealing washer. The pin member is provided with a conical or tapered portion, near its second end, and includes a cylindrical portion just beyond that conical portion, which is surrounded by the sealing washer. The sealing washer has its lower surface abutting the enlarged cylindrical end portion of the pin. Moreover, the sealing washer has an outside diameter which substantially corresponds with the outside diameter of that end portion of the valve pin. Consequently, the aforedescribed required efficient sealing is attained, while there is avoided the possibility of the hang-up presented by an element such as the cup-like member of a conventional metallic valve core.

A substantial advantage of the construction of a valve core in accordance with the invention is that a recess does not have to be made in the valve body as is done in accordance with conventional practice. The reason for this practice is that due to the size and shape of a valve core that is to be fitted into a conventionally drilled standard valve body, the recess is necessary to allow for properly inflating a device such as a tire or the like. However, in the present instance the configuration is such that the charging of air when inflating is in a straight down manner and as a result the recess does not have to be provided. Consequently, a stronger valve is achievable than those obtained by following conventional practice.

Other and further objects, advantages and features of the present invention will be understood by reference to the following specification in conjunction with the annexed drawing, wherein like parts have been given like numbers.

BRIEF DESCRIPTION OF THE DRAWING

FIG. 1A is a sectional view of the valve core in accordance with a first embodiment of the present invention, and illustrating the pin member in both the fully closed and fully opened positions;

FIG. 1B is a top plan view of the valve core seen in FIG. 1A; and

FIG. 2 is a sectional view of another embodiment of the valve core, such embodiment providing a slightly different configuration from that of FIG. 1.

DESCRIPTION OF PREFERRED EMBODIMENTS

Referring now to FIG. 1, there is shown a first embodiment of a valve core in accordance with the present invention. The core is designated generally by reference numeral 10 and it is shown fitted within a valve stem or body 12. The body 12 is of standard or any suitable construction, having an external thread 14 to receive a cap, not shown, and having an internal thread 16 for receiving and engaging the valve core 10.

The valve core 10 essentially consists of the three simple components, namely, a unitary cylindrical barrel 18, preferably of plastic and formed by injection molding or like technique; a pin 20 of metal or plastic; and a sealing washer 22 constituted of elastomeric material, such as rubber. Barrel 18 has an upper threaded portion 18A on its external surface adjacent its upper end 18B which end includes a more or less standard valve core bridge, which in this first embodiment has a slotted opening 18C. The bridge 18B is of generally oblong shape, thus being adapted for ready engagement by a tool. Communicating with the slotted opening is the tapered or beveled portion 18D of an axial bore 18E which extends through the barrel 18, such bore being otherwise cylindrical and terminating in a lower opening 18F of diameter just sufficient to clear the outwardly tapered or conical portion 20A of pin 20. The lower end of the pin further includes, just beyond the tapered portion 20A, a cylindrical portion 20B of a diameter substantially the same as the inner diameter of the bore 18E, and further includes an enlarged cylindrical end portion 20C which has a diameter greater than that of cylindrical portion 20B and equal to the outer diameter of a sealing washer 22. The very tip of the pin 20 terminates in a slightly beveled portion 20D.

Accordingly, it will be seen that a substantial annulus of contact 18G exists for seating of the valve; that is, a broad area of contact is provided at the lower end of the barrel 18 with respect to the upper surface of the annular washer 22 when the valve pin 20 is in its closed position.

As already noted, the cross-sectional view in FIG. 1A illustrates both the fully closed and fully opened positions for the valve pin 20, the fully closed being shown in solid lines, while the fully open is indicated in phantom.

Referring now to the configuration for the external surface of barrel 18, in addition to the threaded part 18A, there is also provided a tapered portion immediately below the threads. This portion is designated 18H, its taper being less than the taper of the portion 12A in the bore of the valve body 12. As a result, when the valve core 10 is screwed in place, it will be seen that the portion 18H of the valve barrel will bear against the lower portion 12A of the body 12, particularly at the point designated 12B which is known as the point of static seal for the core 10. A slight jog or shoulder 18J is provided just below the point of static seal and the barrel continues in its cylindrical configuration 18K with a slight clearance with respect to the interior surface of the portion 12C, with a final tapered or conical portion 18L just above the annular contact area or portion 18G.

As will be understood by those skilled in the art, the static seal as known before is provided by reason of the fact that self-sealing occurs at the point 12B because of the inherent sealing characteristics of the polymer material selected, such as, for example, nylon or acetal. Moreover, the dynamic seal is an extremely broad area seal because of the precision of the configuration just discussed above; particularly, due to the fact that a large annular contact or seating area is afforded at 18G and that this seating area at the end of the barrel 18 is fully contacted by the sealing washer 22.

Although it is contemplated in the embodiments illustrated that under most circumstances a spring means can be dispensed with, in the event that use with extremely low pressure dictates that a spring means 24 be employed, such can be disposed between the lower surface of the upper flattened end 20E of the pin and the top portion 18B of the barrel 18, as seen in dotted lines.

Referring now to FIG. 2, another embodiment of the valve core is there illustrated. The same reference characters have been utilized to indicate the same or very similar parts. One of the essential differences between the second embodiment and the first is that a more restricted opening 18C is present in the second embodiment at the top of the bridge 18B of the barrel 18. However, a channel or groove 20F is provided in the valve pin to enable a greater flow of air than would otherwise be possible through cylindrical opening 18C alone.

While there have been shown and described what are considered at present to be the peferred embodiments of the present invention, it will be appreciated by those skilled in the art that modifications of such embodiments may be made. It is therefore desired that the invention not be limited to these embodiments, and it is intended to cover in the appended claims all such modifications as fall within the true spirit and scope of the invention.

What is claimed is:

1. A valve core adapted for incorporation within a valve stem or body having interior threads, said valve core comprising a unitary molded plastic cylindrical barrel having an axial bore extending therethrough, and an external threaded portion thereon, at a first or outer part of said barrel, adapted for threaded engagement with the interior threads of said valve body, said threaded portion including an oblong bridge adapted for ready engagement by a tool, the first end of said barrel at said bridge having an opening from said bore;

means for providing that the second or inner part of said barrel is adapted by itself to effect the required static seal with respect to said valve body, said means including an inwardly tapered internal portion of said valve body;

a broad planar annular surface area of contact defined between the inner and outer peripheries at the second or inner end of said barrel;

a unitary elongated cylindrical valve pin with enlarged inner and outer ends, the inner end being cylindrical, said pin being disposed within said barrel in an axial relationship therewith, and said pin being slidably received within said bore;

said valve pin having adjacent its second or inner end a conical portion whose greatest diameter is substantially equal to the bore diameter, and having a cylindrical portion immediately below the conical portion, the cylindrical portion having a diameter substantially equal to said greatest diameter;

a cylindrical sealing washer surrounding said lower cylindrical portion of said valve pin and having a corresponding broad planar upper surface for contacting said broad planar annular surface area of contact defined at the inner end of said barrel, the outer diameter of said sealing washer being substantially equal to the diameter at the outer periphery of the inner end of said barrel, the lower surface of said sealing washer being adapted to engage the integral, cylindrical, enlarged inner end of said pin, said end having a fixed diameter substantially equal to the outer diameter of said washer, whereby said washer is compressible against said broad planar annular contact area in sealing relationship therewith by movement of said pin axially outwardly.

2. A valve core as defined in claim 1, in which said barrel includes an inwardly tapered external portion adapted to bear against the inwardly tapered internal portion of said valve body in effecting such static seal.

3. A valve core as defined in claim 1, further comprising a shoulder formed in the external surface of said barrel just below the point of static seal, and a cylindrical portion for said barrel below said shoulder.

4. A valve core as defined in claim 1, in which said opening at the first end of said barrel is a slotted opening, and in which said axial bore includes a tapered portion at the first end of said barrel, said tapered portion communicating with said slotted opening.

5. A valve core as defined in claim 1, further comprising a channel or groove at the interior of said valve pin to permit a substantial flow of air.

6. A valve core as defined in claim 2, in which the inwardly tapered external portion of the barrel has a taper less than that of the inwardly tapered internal portion of the valve body.

* * * * *